United States Patent
Lynch et al.

(10) Patent No.: US 8,202,952 B2
(45) Date of Patent: Jun. 19, 2012

(54) PROCESS FOR MAKING ETHYLENE HOMOPOLYMERS

(75) Inventors: Michael W. Lynch, West Chester, OH (US); Mark K. Reinking, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 751 days.

(21) Appl. No.: 12/313,576

(22) Filed: Nov. 21, 2008

(65) Prior Publication Data

US 2010/0129581 A1    May 27, 2010

(51) Int. Cl.
*C08F 4/78* (2006.01)
*C08F 2/14* (2006.01)
*C08F 110/02* (2006.01)

(52) U.S. Cl. ............... 526/106; 526/64; 526/903

(58) Field of Classification Search ............ 526/64, 526/106, 903
See application file for complete search history.

(56) References Cited

U.S. PATENT DOCUMENTS

| | | |
|---|---|---|
| 2,825,721 A | 1/1958 | Hogan et al. |
| 3,248,179 A | 4/1966 | Norwood |
| 3,281,405 A | 10/1966 | Hogan |
| 3,644,323 A | 2/1972 | Norwood et al. |
| 3,780,011 A | 12/1973 | Pullukat et al. |
| 3,819,811 A | 6/1974 | Aboutboul et al. |
| 3,976,632 A | 8/1976 | Delap |
| 4,031,298 A | 6/1977 | Pullukat et al. |
| 4,053,565 A | 10/1977 | Krekeler et al. |
| 4,173,548 A | 11/1979 | Pullukat et al. |
| 4,177,162 A | 12/1979 | McDaniel et al. |
| 4,252,928 A * | 2/1981 | Eve ..................... 526/106 |
| 4,297,460 A | 10/1981 | McDaniel et al. |
| 4,302,566 A | 11/1981 | Karol et al. |
| 4,374,234 A | 2/1983 | Stricklen et al. |
| 4,981,927 A | 1/1991 | Rekers et al. |
| 5,037,911 A | 8/1991 | McDaniel et al. |
| 5,093,300 A | 3/1992 | Vogels et al. |
| 5,198,400 A | 3/1993 | Katzen et al. |
| 5,834,571 A | 11/1998 | Bernier et al. |
| 6,147,171 A | 11/2000 | Rohde |
| 6,465,586 B2 | 10/2002 | McDaniel et al. |
| 6,569,960 B2 | 5/2003 | Bergmeister et al. |
| 6,632,896 B1 | 10/2003 | Almquist et al. |
| 7,407,591 B2 | 8/2008 | De Battisti et al. |

FOREIGN PATENT DOCUMENTS

JP    2007-131835    *    5/2007

OTHER PUBLICATIONS

Liu et al, Mechanistic implications of the unprecedented transformations of ethene into propene and butene over Phillips CrOx/SiO2 catalyst during induction period, J. Molecular Catalysis A: Chemical 201 (2003) 189-197.*
Machine translation of JP 2007-131835; pub. date: May 2007.*

* cited by examiner

*Primary Examiner* — Fred M Teskin

(57) ABSTRACT

A process for making an ethylene homopolymer in the presence of an oxide-supported chromium catalyst is disclosed. A small amount of an α-olefin contacted with the catalyst before polymerizing ethylene or introduced into an ethylene homopolymerization unexpectedly boosts process productivity. When used at part per million levels, the α-olefin improves productivity while maintaining desirable polymer properties. The invention is particularly valuable for making HDPE resins useful for blow molding applications.

13 Claims, No Drawings

PROCESS FOR MAKING ETHYLENE HOMOPOLYMERS

FIELD OF THE INVENTION

The invention relates to a high-productivity process for making polyethylene, particularly ethylene homopolymers.

BACKGROUND OF THE INVENTION

Chromium or "chrome" catalysts, also called "Phillips catalysts," are oxidized chromium compounds fixed on porous oxide solids that are valuable mainstays for polymerizing ethylene or copolymerizing ethylene with other α-olefins. The catalysts are usually made by impregnating the porous oxide with a chromium (III)-containing solution, evaporating the solvent, and heating the supported chromium compound to 400 to 1000° C. under oxidizing conditions to activate the catalyst and convert the Cr(III) species to a Cr(VI) species (see, e.g., U.S. Pat. No. 2,825,721).

Even after oxidation to a Cr(VI) species, however, chromium catalysts are often not immediately active when combined with ethylene or other monomers. Usually, an "induction" period or time lasting from a few minutes to an hour or so precedes polymerization (see U.S. Pat. No. 7,407,591).

Chromium catalysts are often modified with compounds that contain boron, aluminum, magnesium, titanium, vanadium, fluorine, or other elements. Some of these modified catalysts activate more quickly and have reduced induction times compared with earlier catalysts. For example, the boron-modified chromium on silica catalysts described in U.S. Pat. Nos. 3,780,011 and 4,173,548 provide improved reactivity while maintaining a narrow polymer molecular weight distribution. U.S. Pat. No. 4,374,234 teaches the use of chromium catalysts modified by addition of trialkylaluminum or dialkylmagnesium compounds to reduce the induction time.

Numerous techniques are recommended for activating chromium catalysts, some of which help to reduce the induction time. U.S. Pat. No. 3,281,405, for instance, describes a two-stage air activation process in which the supported chromium catalyst is heated first at 1500 to 2000° F., and then at 800 to 1500° F. in the presence of air to improve productivity while maintaining a desirable melt index. U.S. Pat. No. 4,173,548 teaches to form and activate a boron-modified chromium on silica catalyst at elevated temperature (about 600° C.) in a fluidized bed with a substantially dry reducing gas (e.g., a mixture of nitrogen and carbon monoxide) followed by an oxidizing gas (e.g., air) also at elevated temperature, followed by cooling in an inert atmosphere. The catalyst has improved reactivity. In another approach, taught in U.S. Pat. No. 5,093,300, a fluidized bed of chromium on silica catalyst is activated successively with (1) dry air at 815° C.; (2) dry air at 650° C.; (3) dry nitrogen at 650° C.; and (4) dry nitrogen at 650 to 350° C., followed by cooling to room temperature.

U.S. Pat. No. 6,147,171 teaches to shorten the induction time of a Phillips catalyst by reducing it with an internal alkene, an alkyne, 1,3-butadiene, or an aldehyde. Suitable alkenes include, e.g., E- or Z-2-butene, E- or Z-2-pentene, E- or Z-2-hexene, and similar compounds. Ethylene and α-olefins ("$C_3$-$C_{10}$ 1-alkenes") are expressly taught as unsuitable reducing agents.

The slurry-loop process for making polyethylene is well known and has long been commercial (see, e.g., U.S. Pat. Nos. 3,248,179 and 3,644,323).

It is well known, of course, to polymerize ethylene in the presence of an α-olefin comonomer, usually to generate polyolefins having reduced densities and substantial amounts of incorporated comonomer units. For example, U.S. Pat. No. 6,465,586 teaches to use 0.1 to 10 wt. % of the comonomer. U.S. Pat. No. 4,374,234 teaches to use 0.2 to 20 wt. % of the comonomer. U.S. Pat. No. 6,632,896 teaches to use 1-13 moles of comonomer per kmole of ethylene, i.e., >0.1 wt. %. Thus, at least about 0.1 wt. % of a comonomer is typically taught for use, and much higher levels are normally used to reduce polyolefin density.

Of particular interest are high-density polyethylene resins commonly used for blow molding milk, water, or juice bottles. These resins require high density (usually at least 0.957 g/cm$^3$) for good stiffness properties (see U.S. Pat. No. 5,198,400). Additionally, the resin must have good organoleptic properties (i.e., taste, odor) so the amount of unincorporated residual monomer present in the resin must be very low or nonexistent. Ideally, such resins could be made more efficiently while maintaining high stiffness and good organoleptics.

In sum, the industry would benefit from improved ways to improve process productivity and reduce or eliminate the induction time normally associated with using oxide-supported chromium catalysts. A valuable process could be used in conjunction with well-known activating techniques. Preferably, the process could be practiced in conventional slurry-loop ethylene polymerizations using existing equipment, well-established operating procedures, and common chromium catalysts and activating reagents. An ideal process could efficiently provide high-density polyethylene resins useful for making blow-molded bottles.

SUMMARY OF THE INVENTION

The invention is a process for making an ethylene homopolymer. The process comprises polymerizing ethylene in a reactor in the presence of an oxide-supported chromium catalyst, a diluent, and an α-olefin to produce an ethylene homopolymer. The α-olefin is used in an amount effective to increase process productivity. A small amount of an α-olefin—contacted with the catalyst before polymerizing the ethylene or introduced into an ethylene homopolymerization process—unexpectedly boosts productivity. When used at part per million levels, the α-olefin improves productivity while maintaining desirable polymer properties. The invention is particularly valuable for the slurry-loop reactor production of HDPE resins useful for blow molding.

DETAILED DESCRIPTION OF THE INVENTION

The invention is a process for polymerizing ethylene to make an ethylene homopolymer. By "homopolymer," we mean that all or substantially all of the recurring units of the polymer derive from ethylene. The amount of any incorporated α-olefin will be insufficient to materially impact important properties of the ethylene homopolymer (e.g., density, melt index). Thus, any incorporated α-olefin is preferably less than 0.1 wt. %, more preferably less than 500 ppm, and most preferably less than 150 ppm, based on the amount of ethylene homopolymer.

The inventive process can be practiced in any gas, slurry, solution, or bulk polymerization that uses an oxide-supported chromium catalyst to polymerize ethylene. However, the ethylene homopolymer is advantageously produced using the well-known gas-phase and slurry-loop polymerization processes. Both processes have been commercial for many years and need not be discussed at length here. For example, U.S. Pat. Nos. 4,302,566 and 5,834,571, the teachings of which are incorporated herein by reference, disclose suitable gas-phase processes. U.S. Pat. Nos. 3,248,179 and 3,644,323, the teachings of which are incorporated herein by reference, disclose typical slurry-loop processes. In the slurry-loop process, ethylene, catalyst, and diluent circulate in a closed loop with the help of a pump or other motor-driven device. As the polymerization proceeds, the ethylene homopolymer is periodically or continuously withdrawn from the reactor from any convenient point. Liquid or volatile materials are returned to the loop.

The process uses an oxide-supported chromium catalyst. Suitable oxide supports contain oxygen and one or more elements selected from silicon, aluminum, titanium, boron, magnesium, fluorine, and zirconium. Examples include silicas, silica-aluminas, aluminas, zirconias, titanias, borias, magnesias, aluminum phosphates, and mixtures thereof. Silicas are most preferred. Preferred oxide supports have surface areas in the range of 200 to 800 $m^2/g$, more preferably from 300 to 600 $m^2/g$. Preferred oxide supports have pore volumes within the range of 1 to 4 mL/g, more preferably from 1.5 to 3.5 mL/g. Suitable oxide supports are described in U.S. Pat. Nos. 2,825,721; 3,819,811; 4,053,565; 4,177,162; 5,037,911; 6,147,171; and 6,569,960, the teachings of which are incorporated herein by reference.

Chromium sources for the oxide-supported catalyst are well known. Usually, one or more chromium-containing compounds capable of reacting or interacting with oxygen atoms or surface hydroxyl groups of the support are used. Examples include chromium trioxide, chromium nitrate, organochromium compounds, chromium sulfate, ammonium chromate, chromate esters, and the like. Suitable chromium sources are disclosed in U.S. Pat. Nos. 2,825,721; 4,031,298; 4,173,548; 5,198,400; and 6,465,586, the teachings of which are incorporated herein by reference.

The chromium source can be combined with the support in any desired manner. U.S. Pat. Nos. 3,976,632 and 4,297,460, the teachings of which are incorporated herein by reference, provide a few examples of how to combine the chromium source and the support. The amount of chromium in the oxide-supported chromium catalyst can vary, but it is preferably in the range of 0.1 to 10 wt. %, more preferably from 0.5 to 5 wt. %.

The oxide-supported chromium catalyst can be modified with compounds containing boron, phosphorus, aluminum, vanadium, titanium, zirconium, fluorine (as fluoride), or other elements. The modifiers are typically included to increase activity, improve operability, or enhance the processability or physical properties of the ethylene homopolymer. Many of these modifiers interact with oxygen atoms or surface hydroxyl groups of the oxide support. Examples include borate esters, boron halides, trialkyboranes, triarylboranes, phosphate esters, aluminum alkoxides, alkylaluminum compounds, aluminum halides, vanadium halides, titanium halides, organotitanates, zirconium halides, organozirconates, and the like, and mixtures thereof. Additional examples of suitable modifiers are disclosed in U.S. Pat. Nos. 2,825,721; 3,780,011; 4,173,548; 4,374,234; 4,981,927; and 5,198,400, the teachings of which are incorporated herein by reference.

Prior to their use in the inventive process, the oxide-supported chromium catalysts may be activated by conventional techniques. In particular, the oxide-supported chromium catalysts, prior to use, are normally activated by heating to elevated temperatures under oxidizing conditions to convert at least some of the Cr(III) species to Cr(VI). Thereafter, the catalyst is usually allowed to cool in an inert atmosphere to preserve the highly oxidized chromium species. Suitable activation schemes have been described elsewhere in considerable detail; see, e.g., U.S. Pat. Nos. 3,281,405; 4,173,548; 5,093,300; and 6,632,896, the teachings of which are incorporated herein by reference.

A diluent is used in the process. Suitable diluents will not interfere with polymerization of ethylene and are volatile enough to be removed easily from the ethylene homopolymer after the polymerization is complete. Typically, for a gas-phase process, the diluent is a carrier gas (nitrogen, propane, argon), while the slurry-loop process typically uses a volatile aliphatic hydrocarbon such as butane, isobutane, pentane, isopentane, hexane, or isohexane. Isobutane is most preferred.

The ethylene polymerization is performed in the presence of an α-olefin. Suitable α-olefins have a terminal carbon-carbon double bond, i.e., a vinyl or vinylidene group. Examples include propylene, 1-butene, isobutylene, 1-pentene, 1-hexene, and the like, and mixtures thereof. Propylene, 1-butene, and isobutylene are preferred. Propylene is particularly preferred for making HDPE resins suitable for use in blow molding.

The α-olefin is used in an amount effective to increase the productivity of the process compared with the productivity when performed in the absence of the α-olefin. By "productivity," we mean the amount of ethylene homopolymer that can be produced from a given amount of oxide-supported chromium catalyst per given unit of time. Typically, this is conveniently expressed in terms of the number of grams of ethylene homopolymer produced per gram of oxide-supported chromium catalyst per hour. The actual amount of α-olefin needed to increase productivity will naturally depend on many factors within the skilled person's control, including, for example, the kind of process used, the amount of diluent relative to the amount of ethylene, catalyst selection, reaction temperature and pressure, and other factors.

Preferably, the amount of α-olefin used is less than an amount sufficient to significantly alter polymer properties, e.g., reduced density, lower DSC melting point, increased melt index, or the like. Preferably, the α-olefin is used in an amount less than 1500 ppm, more preferably less than 1000 ppm, even more preferably within the range of 1 to 500 ppm, and most preferably from 10 to 300 ppm, based on the amount of diluent. The impact on properties of the ethylene homopolymer will be less noticeable and often undetectable when the amount of α-olefin is less than 1000 ppm.

The α-olefin can be included in the polymerization by any suitable means. In one approach, the α-olefin is "pre-contacted" with the oxide-supported chromium catalyst. The oxide-supported chromium catalyst is first prepared and activated in the usual manner, but before the activated catalyst is used to polymerize ethylene, it is combined with some or all of the α-olefin, preferably under an inert atmosphere such as nitrogen. The manner in which the catalyst and α-olefin are combined is not particularly critical. Contact times are preferably from 0.1 to 10 hours, more preferably from 0.5 to 2 hours. Examples 1, 3, and 5 (below) illustrate the approach. Surprisingly, pre-contacting the oxide-supported chromium catalyst with a small amount of an α-olefin reduces the induction time by 25-60% without significantly changing density, melting point, melt index, or other important polymer properties.

In another approach, the α-olefin is added after the ethylene polymerization has already started. As shown below in Example 7 and Comparative Example 8, adding 1-butene in this way into an ethylene homopolymerization catalyzed by an oxide-supported chromium catalyst can boost process productivity dramatically.

In still other approaches, the α-olefin is introduced concurrently or as a combined stream with the ethylene, or is introduced in one portion early in the polymerization. Many variations will be apparent to the skilled person.

The invention enables more efficient production of ethylene homopolymers. Boosting process productivity and reducing induction times means less waste of valuable plant time waiting for a polymerization to initiate or achieve its optimum rate. The productivity increase is preferably at least 10%, more preferably at least 20%, compared with the productivity of the process when performed in the absence of the α-olefin. Moreover, the improvement in operating efficiency can be achieved while maintaining valuable attributes of the ethylene homopolymers, particularly the high densities, good stiffness, high melting points, and low melt indices that characterize these polymers.

Ethylene homopolymers produced by the process of the invention preferably have densities greater than 0.955 g/cm$^3$, more preferably at least 0.957 g/cm$^3$, and most preferably in the range of 0.957 to 0.962 g/cm$^3$. The homopolymers preferably have a DSC melting point of at least 133° C., more preferably at least 133.5° C., and most preferably at least 134.5° C. In addition, the homopolymers preferably have a melt index (measured according to ASTM D1238) in the range of MI$_{20}$=2 g/10 min. to MI$_2$=100 g/10 min., more preferably in the range of MI$_{20}$=5 g/10 min. to MI$_2$=10 g/10 min, most preferably in the range of MI$_2$=0.1 g/10 min. to MI$_2$=2 g/10 min. The ethylene homopolymers preferably have a modulus (as measured according to ASTM D790) greater than 200 kpsi, more preferably greater than 250 kpsi.

The ethylene homopolymers have many uses. They can be used, for example, for making various articles, including: films; extruded sheets; injection-molded, rotomolded, or blow-molded articles; wire-and-cable applications; extrusion coatings; and pipe applications. The homopolymers are particularly valuable for making extruded sheets and blow-molded articles.

In one aspect, the invention relates to a process for making HDPE resins useful for blow molding applications, particularly plastic bottles such as those used for water, milk, or juice. A typical example is Petrothene LM600700 (product of Equistar Chemicals, LP), a high-density polyethylene resin having good rigidity and very low odor and taste characteristics. The resin has a melt index of about 0.80 g/10 min. and a density of 0.960+g/cm$^3$, and it meets certain FDA requirements for food contact.

Such resins require superior organoleptic properties (i.e., taste and odor), which usually relate to the level of residual organics in the homopolymer resin. Thus, in one aspect of the invention, an ethylene homopolymer resin is prepared in the presence of from 1 to 500 ppm, more preferably from 10 to 300 ppm, based on the amount of diluent, of propylene. Because propylene is either incorporated into the homopolymer or rapidly volatilizes during polymer isolation, the taste and odor qualities of the ethylene homopolymer are not compromised by inclusion of propylene. On the other hand, including ppm levels of propylene in the ethylene polymerization in accord with the inventive process improves melt index potential and process productivity (see Example 9, below).

The following examples merely illustrate the invention. Those skilled in the art will recognize many variations that are within the spirit of the invention and scope of the claims.

General Procedure:

Polymerizations are performed in a one-gallon, stainless-steel batch reactor equipped with a single-pass water/steam temperature controller. Ethylene flow and pressure are controlled using a Brooks 5850 mass flow meter and control valve. Master reactor control is maintained using an Allen-Bradley programmable logic controller (PLC) with inputs from a touch screen. Data acquisition is performed using a personal computer and Wintrend software.

The catalyst is a chromium-impregnated silica catalyst prepared generally as described in U.S. Pat. No. 3,780,011 and activated by heating in the presence of air to 860° C. All transfers of activated catalyst are performed under a dry nitrogen atmosphere.

EXAMPLES 1, 3, 5 and COMPARATIVE EXAMPLES 2, 4, and 6

Effect of Pre-Contacting Catalyst with 1-Butene

The reactor is charged with activated catalyst (about 200 mg), and a known amount of 1-butene (170, 500, or 1400 ppm, based on the amount of isobutane) is flushed into the reactor with the isobutane (1600 mL) solvent. The catalyst, isobutane, and 1-butene are mixed ("pre-contacted") at 100° F. (38° C.) for 0.5 to 2 h. The reactor is charged with ethylene to start the polymerization. The induction time, if any, is recorded as the time at which significant ethylene consumption begins. Temperature is controlled at 215° F. (102° C.). Ethylene is fed on demand to maintain about 18 mole % ethylene in the reactor. Reactor pressure is maintained at about 550 psig.

When the polymerization is complete (typically about 2 h), the reactor contents are discharged, and isobutane is flashed from the polymer. The melt index (MI$_2$) is measured according to ASTM D1238, condition 190/2.16. Density changes are estimated from the melting point as measured using differential scanning calorimetry (DSC). Average particle size is measured by laser light scattering on a Malvern instrument. Induction times and polymer properties appear in Table 1.

The results demonstrate that pre-contacting an oxide-supported chromium catalyst with a small amount of an α-olefin (here, 170 to 1400 ppm based on the amount of isobutane used) is effective in reducing induction time by at least 25-30%. The reduction can be achieved without materially changing important properties of the resulting ethylene homopolymer (MI$_2$, DSC melting point, particle size, bulk density), particularly when 500 ppm or less of the α-olefin is used.

EXAMPLE 7 and COMPARATIVE EXAMPLE 8

Effect of Adding 1-Butene During an Ethylene Polymerization

The general procedures noted above are repeated, except that the chromium-impregnated silica catalyst is not pre-contacted with 1-butene. Instead, the 1-butene is added to the reactor after ethylene polymerization is underway.

In a control experiment (Comparative Example 7), performed as described earlier but with no added 1-butene, ethylene polymerization begins 25 minutes from the start of ethylene addition. The amounts of polyethylene produced at t=50, 70, and 85 minutes are 100 g, 200 g, and 350 g, respectively.

In a similar polymerization (Example 8), 1-butene (1400 ppm based on the amount of isobutane used) is introduced at t=52 minutes. Just before adding 1-butene, the ethylene polymerization rate is 433 g/h. Three minutes after 1-butene addition (t=55 min.), the rate increases to 700 g/h, a 61% increase. At t=60 minutes, the rate is 974 g/h, a 225% increase.

These examples demonstrate that process productivity can be boosted dramatically by introducing a low level of an α-olefin into a slurry homopolymerization of ethylene catalyzed by an oxide-supported chromium catalyst.

EXAMPLE 9

Preparation of an HDPE Resin Suitable for Blow Molding

A high-density polyethylene resin is produced on a commercial vertical slurry loop reactor (volume: ~11,200 gal) with a typical production capacity of 30,000 lbs. of polyethylene per hour. In normal operation, isobutane diluent, ethylene, hydrogen, and catalyst are fed to the reactor. The reactor temperature is adjusted to control melt index while the catalyst feed rate is controlled to maintain the desired production rate.

In the inventive mode, the reactor is run similarly except that a small quantity of propylene (~100 ppm based on the amount of isobutane used) is added. The melt index is adjusted with reactor temperature. When lined out at the correct MI$_2$ and production rate, less catalyst feed is required, indicating higher process productivity in the presence of the added propylene.

The examples are meant only as illustrations. The following claims define the invention.

TABLE 1

Effect on Induction Time and Polymer Properties:
Pre-contacting Catalyst with 1-Butene

| | Polymerization Conditions | | | Polymer Properties | | | |
|---|---|---|---|---|---|---|---|
| Ex. # | 1-butene (ppm[2]) | Pre-contacted catalyst?[1] | Induction time (min) | $MI_2$ (g/10 min) | DSC mp (° C.) | Ave. particle size (μ) | Bulk density (g/cm³) |
| 1 | 1400 | yes | 15 | 0.29 | 133.7 | 948 | 0.38 |
| C2 | 0 | no | 38 | 0.21 | 135.0 | 922 | 0.34 |
| 3 | 500 | yes | 27 | 0.30 | 134.7 | 1283 | 0.37 |
| C4 | 0 | no | 72 | 0.30 | 134.9 | 1357 | 0.37 |
| 5 | 170 | yes | 45 | 0.30 | — | — | — |
| C6 | 0 | no | 60 | 0.29 | — | — | — |

[1]Catalyst pre-contacted with 1-butene for 0.5 to 2 h prior to introducing ethylene into the reactor.
[2]Based on amount of isobutane used.
Results reported for each example are an average of several runs.

We claim:

1. A process comprising polymerizing ethylene in a reactor in the presence of an oxide-supported chromium catalyst, a diluent, and an a-olefin to produce an ethylene homopolymer; wherein the α-olefin is used in an amount effective to increase the productivity of the process compared with the productivity of the process when performed in the absence of the α-olefin.

2. The process of claim 1 wherein the oxide-supported chromium catalyst is contacted with the a-olefin prior to introducing ethylene into the reactor.

3. The process of claim 1 wherein the α-olefin is added to the reactor during the polymerization.

4. The process of claim 1 wherein the α-olefin is selected from the group consisting of propylene, 1-butene, isobutylene, and mixtures thereof.

5. The process of claim 1 wherein the α-olefin is used in an amount within the range of 1 to 500 ppm based on the amount of diluent.

6. The process of claim 1 wherein the catalyst further comprises at least one element selected from the group consisting of boron, phosphorus, aluminum, vanadium, titanium, fluorine, and zirconium.

7. The process of claim 1 wherein the productivity increase is at least 10%.

8. The process of claim 1 wherein the oxide is selected from the group consisting of silicas, silica-aluminas, aluminas, zirconias, titanias, borias, magnesias, aluminum phosphates, and mixtures thereof.

9. The process of claim 8 wherein the oxide is a silica.

10. The process of claim 1 wherein the reactor is a gas-phase or a slurry-loop reactor.

11. The process of claim 1 wherein the ethylene homopolymer has a melt index within the range of $MI_{20}=5$ g/10 min, to $MI_2=10$ g/10 min, and a density of at least 0.96 g/cm³.

12. A process comprising polymerizing ethylene in a slurry-loop reactor in the presence of a silica-supported chromium catalyst, a volatile aliphatic hydrocarbon diluent, and an a-olefin selected from the group consisting of propylene, 1-butene, and isobutylene, to produce an ethylene homopolymer; wherein the α-olefin is used in an amount within the range of 1 to 500 ppm based on the amount of diluent.

13. The process of claim 12 wherein the a-olefin is propylene, which is used in an amount within the range of 10 to 300 ppm based on the amount of diluent.

* * * * *